(12) United States Patent
Kuroki

(10) Patent No.: US 6,173,018 B1
(45) Date of Patent: Jan. 9, 2001

(54) MULTI LEVEL COMPARATOR FOR DEMODULATOR

(75) Inventor: Shouichi Kuroki, Kagoshima (JP)

(73) Assignee: Sony Corporation, Tokyo (JP)

(*) Notice: Under 35 U.S.C. 154(b), the term of this patent shall be extended for 0 days.

(21) Appl. No.: 08/974,879

(22) Filed: Nov. 20, 1997

(30) Foreign Application Priority Data

Nov. 28, 1996 (JP) .................................... 8-317733

(51) Int. Cl.$^7$ .................................................. H04B 7/185
(52) U.S. Cl. .......................................... 375/317; 375/344
(58) Field of Search ................................ 375/261, 316, 375/344, 287; 329/306, 310; 455/296, 334; 340/825

(56) References Cited

U.S. PATENT DOCUMENTS

| | | | |
|---|---|---|---|
| 4,250,458 | * 2/1981 | Richmond et al. | 329/306 |
| 4,553,102 | * 11/1985 | Yoshida | 329/310 |
| 4,873,702 | * 10/1989 | Chiu | 375/319 |
| 5,052,021 | * 9/1991 | Goto et al. | 375/317 |
| 5,077,538 | 12/1991 | Gert et al. | |
| 5,175,749 | * 12/1992 | Ficht et al. | 375/319 |
| 5,303,416 | * 4/1994 | Morera | 455/296 |
| 5,343,499 | * 8/1994 | Jasper et al. | 375/261 |
| 5,400,366 | * 3/1995 | Iwamatsu | 375/344 |
| 5,425,056 | * 6/1995 | Maroun et al. | 375/316 |
| 5,521,941 | * 5/1996 | Wiatrowski et al. | 375/287 |
| 5,670,951 | * 9/1997 | Servilio et al. | 340/825.44 |

FOREIGN PATENT DOCUMENTS

| | | |
|---|---|---|
| 0 291 947 A2 | 11/1988 | (EP) . |
| 0 307 887 A2 | 3/1989 | (EP) . |
| 0 362 949 A2 | 4/1990 | (EP) . |

* cited by examiner

*Primary Examiner*—Don N. Vo
(74) *Attorney, Agent, or Firm*—Ronald P. Kananen; Rader, Fishman & Grauer (57) ABSTRACT

In a demodulator circuit including a multi-level comparator, the demodulator circuit obtaining output data through comparison, made in a four-level comparator and a NRZ comparator, of a signal obtained by subjecting a received signal to a process of detection and predetermined threshold levels, comprises a level detector circuit for detecting the level of the received signal transmitted through the process of detection and a control circuit for controlling relative magnitudes of the level detected in the level detector circuit of the signal transmitted through the process of detection and the predetermined threshold levels for the four-level comparator and the NRZ comparator, whereby stabilized output data conforming to changes in the level of the detected output are made obtainable.

10 Claims, 7 Drawing Sheets

MULTI LEVEL COMPARATOR FOR DEMODULATOR

BACKGROUND OF THE INVENTION

The invention, in a demodulator circuit such as a pager, relates to a control circuit of threshold levels for a multi-level comparator in the demodulator circuit for detecting a multi-level signal with the use of the comparator.

In a demodulator circuit such as a pager, a multi-level comparator is used for receiving and demodulating a multi-level signal and it is practiced therein to compare the signal transmitted through the process of detection and predetermined threshold levels to obtain the desired signal.

Figure 1:
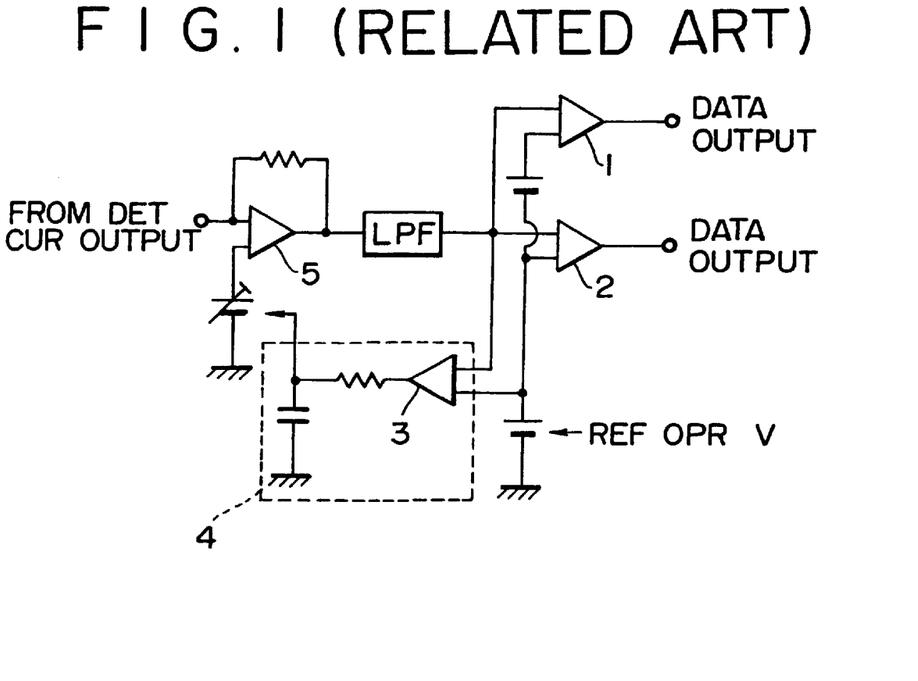
FIG. 1 is a circuit diagram explanatory of a comparator of a related art (first example)
Figure 2:
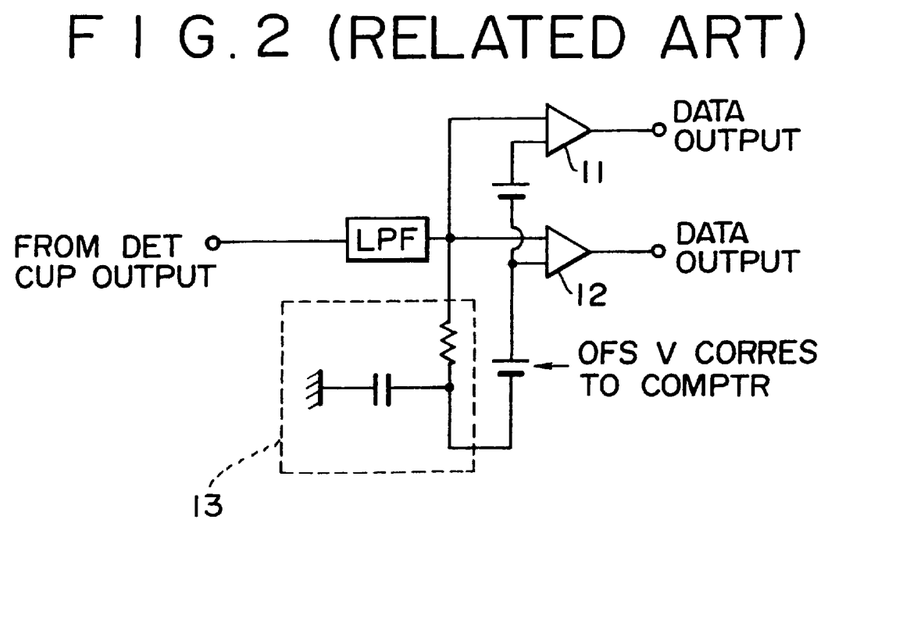
FIG. 2 is a circuit diagram explanatory of a comparator of a related art (second example)

FIG. 1 and FIG. 2 are circuit diagrams explanatory of related art examples. In the circuit shown in FIG. 1, a current output of a detector is input to two comparators 1 and 2 through a low-pass filter (LPF) to be compared therein with their respective different threshold levels and, thereby, output data corresponding to the multivalued data is obtained. Further, in the above described circuit, it is adapted such that the average voltage of the detected output is detected in an average voltage detector circuit 4 and the same is fed back to a comparator 5 as its threshold level and, thereby, the operating point of the detected output is shifted.

In the circuit shown in FIG. 2, it is adapted such that a detector output is input to two comparators 11 and 12 through a low-pass filter (LPF) to be compared with their respective different threshold levels and, thereby, output data corresponding to the multivalued data is obtained. In this circuit, the average voltage of the detected output is detected in an average voltage detector circuit 13 and, with the use of it, the threshold levels for the comparators 11 and 12 are shifted.

However, there have been problems with such circuits that the signal level is shifted by a deviation in the intermediate frequency and thereby lowering of the sensitivity is incurred, or that the threshold levels for the multi-level comparator become unable to follow changes in the level of the detected output and therefore lowering of the sensitivity is incurred when there arise fluctuations in the devices, changes in the temperature, or changes in the input level.

Further, when identical data or biased data are continuously included in the received data, the average value of the level of the detected output changes and an offset is produced between the threshold levels for the comparators and the operating point of the level of the detected output, and hence problems of lowering in the sensitivity or inability of signal reception arise. Still further, in the case of intermittent signal reception, to decrease the time constant in obtaining the average voltage at a rise of the received signal (quick charging), then, by the setting to shorten the rise period, an error voltage is left according to the timing of the quick charging. A problem then arises that the duty cycle of the output data changes at each instant intermittent signal reception is made.

OBJECT AND SUMMARY OF THE INVENTION

An object of the invention is to allow a multi-level comparator to stably operate in conformity with changes in the level of the input signal. Accordingly, in a demodulator circuit for obtaining output data through comparison, made in a comparator, of a signal obtained by subjecting a received signal to a process of detection in a detector circuit and predetermined threshold levels, there is provided a control circuit of threshold levels for a multi-level comparator in the demodulator circuit which comprises a level detector circuit for detecting the level of the received signal transmitted through the process of detection and a control circuit for controlling relative magnitudes of the level detected in the level detector circuit of the signal transmitted through the process of detection and the predetermined threshold levels for the multi-level comparator.

Since, in the invention, the level of a signal transmitted through a process of detection is detected in the level detector circuit and the detected level of the signal transmitted through the process of detection and the predetermined threshold levels for the multi-level comparator are controlled for their relative magnitudes in the control circuit, it is made possible, even if the signal level is changed, to set the predetermined threshold levels at fixed ratios to the changed signal level.

DETAILED DESCRIPTION OF THE PREFERRED EMBODIMENTS

Figure 3:
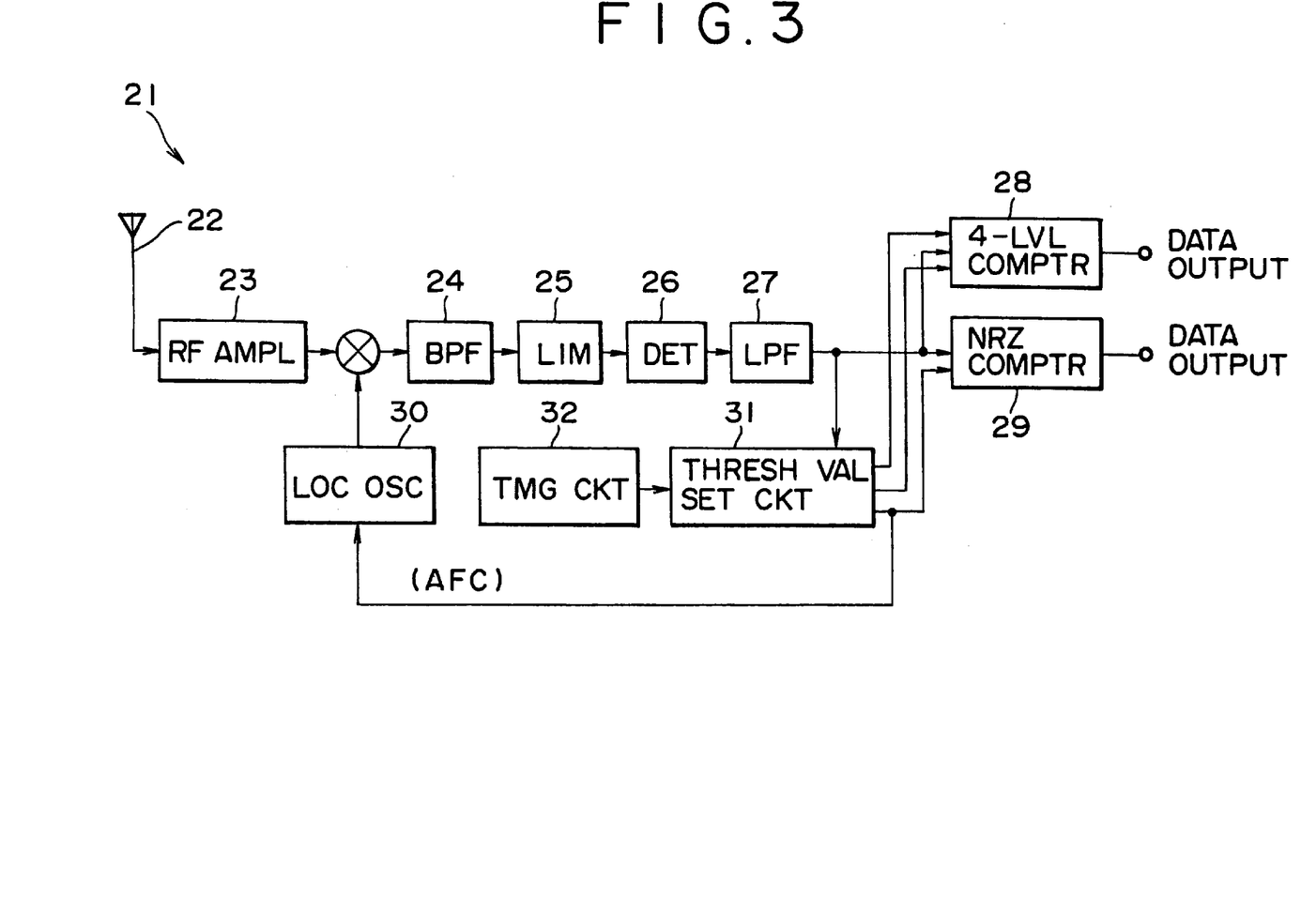
FIG. 3 is a block diagram explanatory of a first embodiment of the demodulator circuit of the invention.

An embodiment of a control circuit of threshold levels for a multi-level comparator in a demodulator circuit according to the invention will be described with reference to the accompanying drawings. FIG. 3 is a block diagram explanatory of a first embodiment. The first embodiment is that establishes predetermined threshold levels for a four-level comparator 28 and an NRZ (non-return-to-zero) comparator 29, for example, used in a demodulator circuit 21 such as a pager.

The demodulator circuit 21 is formed of an antenna 22, an RF amplifier 23, a BPF (band-pass filter) 24, an LIM (limiter) 25, a DET (detector circuit) 26, an LPF (low-pass filter) 27, a four-level comparator 28, an NRZ comparator 29, a local oscillator 30, a threshold level setting circuit 31, and a timing circuit 32.

The threshold level setting circuit 31 characteristic of the present embodiment is operated by the timing circuit 32 formed with a microcomputer (not shown) and establishes threshold levels for the four-level comparator 28 and the NRZ comparator 29 and also supplies the threshold level for the NRZ comparator 29 to the local oscillator 30, namely, delivers a signal for feedback control of the intermediate frequency, or for AFC (Auto Frequency Control).

Figure 4:
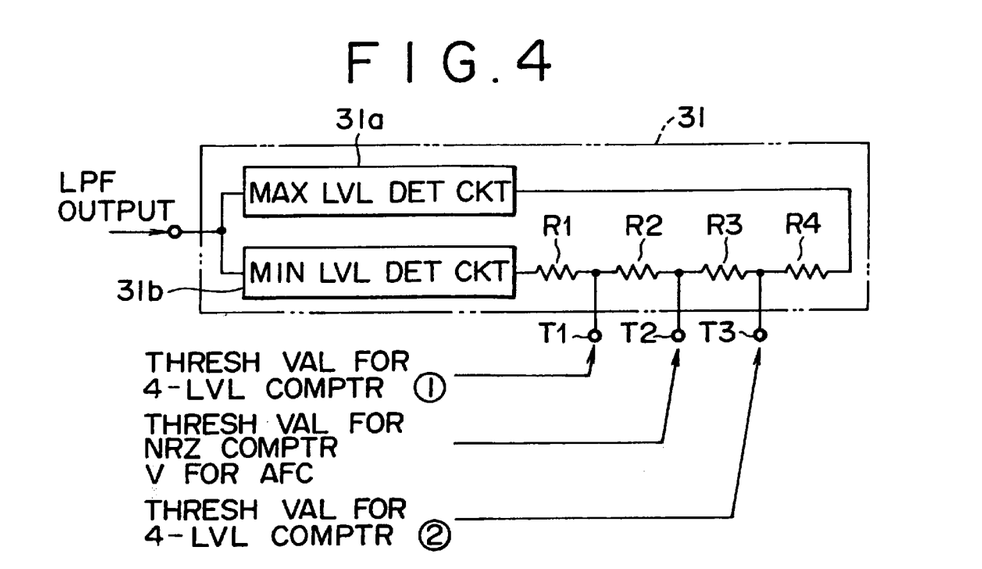
FIG. 4 is a block diagram explanatory of a threshold level setting circuit as a second embodiment of the invention.

The threshold level setting circuit 31 is formed, as shown in FIG. 4, of a MAX level detector circuit 31a, a MIN level detector circuit 31b, and resistors R1–R4. The MAX level detector circuit 31a detects the maximum value of the LPF output and the MIN level detector circuit 31b detects the minimum value of the LPF output. According to the output voltages of the MAX level detector circuit 31a and the MIN level detector circuit 31b and by means of voltage division by the resistors R1–R4, a threshold level ① for the four-level comparator is output from the terminal T1, the threshold level for the NRZ comparator and the voltage for the AFC are output from the terminal T2, and another threshold level ② for the four-level comparator is output from the terminal T3.

By using such threshold level setting circuit 31, it becomes possible to establish each of the threshold levels at fixed ratios to the signal level of the LPF output even if the signal level is changed.

Figure 5A:
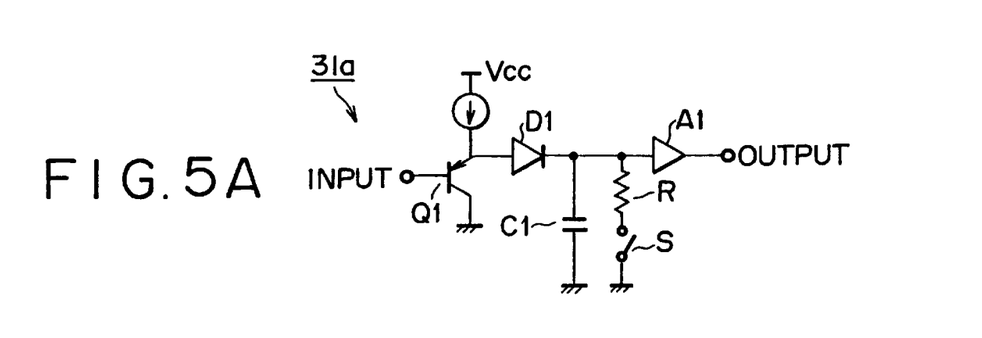
FIG. 5A and 5B is a circuit diagram showing an example of a detector circuit.
Figure 5B:
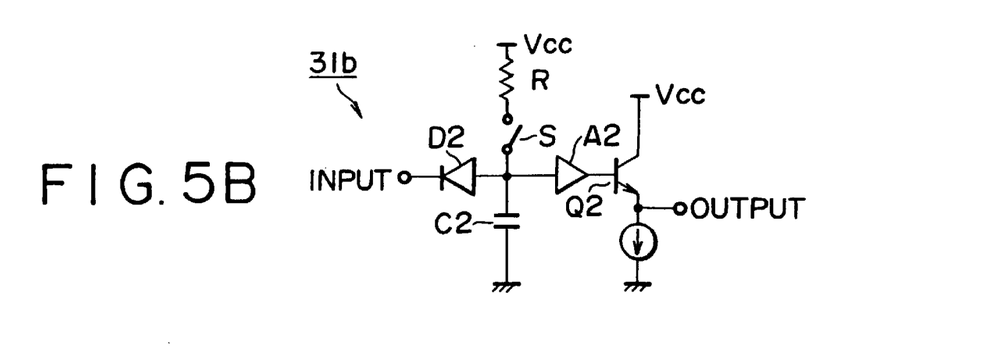

Circuit diagrams showing an example of the detector circuits are given in FIG. 5, in which (a) shows an example of the MAX level detector circuit and (b) shows an example of the MIN level detector circuit. The MAX level detector circuit 31a shown in FIG. 5(a) is an example designed after considering operations in a receiver for a pager or the like (power voltage is 1.5 V, for example), in which the input of the detected output is DC-shifted by the transistor Q1 and the maximum voltage is held by the capacitor C1 through switching operations of the diode D1. At this time, while the charging time constant of the capacitor C1 is determined by the impedance of the diode D1, the impedance is set high (for example, a resistor is connected in series) to improve the antinoise characteristic.

The voltage charged on the capacitor C1 is output through the buffer amplifier A1. The resistor R and the switch S are inserted for resetting the circuit, i.e., for discharging the charges on the capacitor C1, at a discharging time constant of CR. The discharging occurs in response to a signal from the timing circuit 32 shown in FIG. 3.

In the MIN level detector circuit 31b shown in FIG. 5(b), the minimum value of the input of the detected output is charged on the capacitor C2 and an input higher than that, if any, is prevented from being charged by the diode D2. In this circuit, the voltage charged on the capacitor C2 amounts to MIN voltage +1 VF. Therefore, 1 VF is deducted from it by the transistor Q2. Resetting of the circuit by means of the resistor R and the switch S is carried out in response to a signal from the timing circuit 32 shown in FIG. 3.

Figure 6:
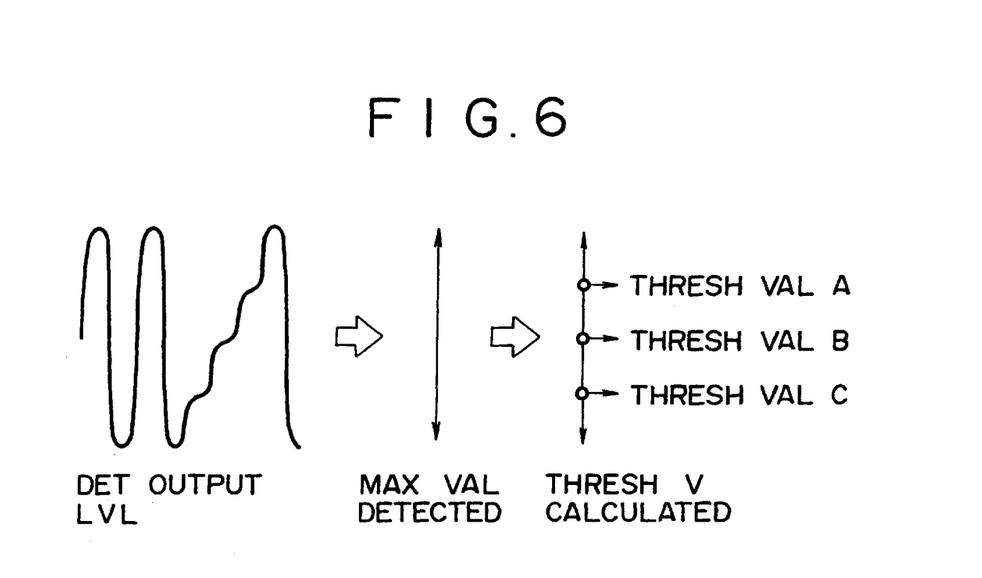
FIG. 6 is a drawing explanatory of functions of a threshold level setting circuit.

Detection of the maximum value can be achieved, as shown in FIG. 6, by inputting the detected output to the MAX level detector circuit 31a and the MIN level detector circuit 31b (refer to FIG. 5) and, by means of the resistors R1–R4 shown in FIG. 4, the threshold levels A–C at fixed ratios to the maximum value can be obtained. Accordingly, even if the level of the detected signal is changed, the threshold levels change proportionally to the changed level, and hence output data corresponding to the changed level can be obtained from the comparators.

Figure 7:
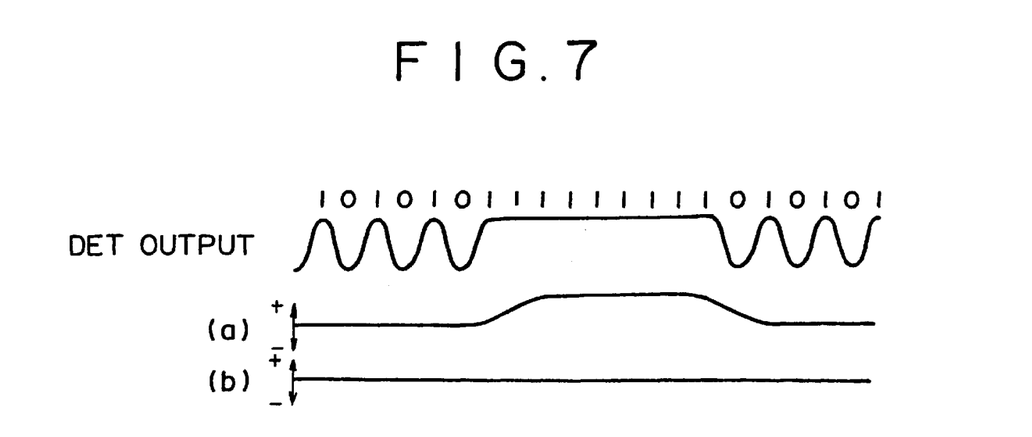
FIG. 7 is a drawing explanatory of variations in the NRZ threshold voltage.

In such a case as shown in FIG. 7 where the detected output is biased to one side of the signal level (to "1" in the case shown), when the NRZ threshold level was set through detection of average voltage (in the related art example), there were variations produced in the NRZ threshold level as shown in (a) affected by the biased detected output. However, according to the NRZ threshold level setting in the present embodiment, a constant NRZ threshold level can be obtained as shown in (b) unaffected by the bias of the detected output.

Figure 8:
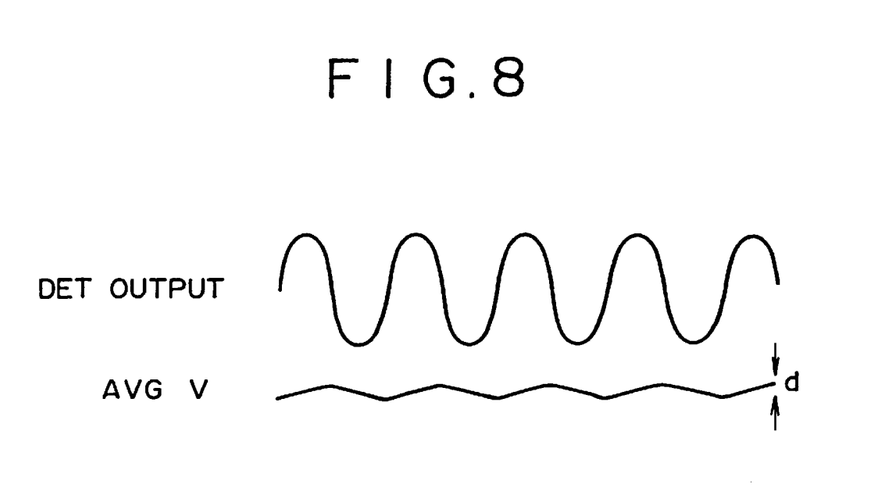
FIG. 8 is a drawing explanatory of error voltage occurring in quick charging.
Figure 9:
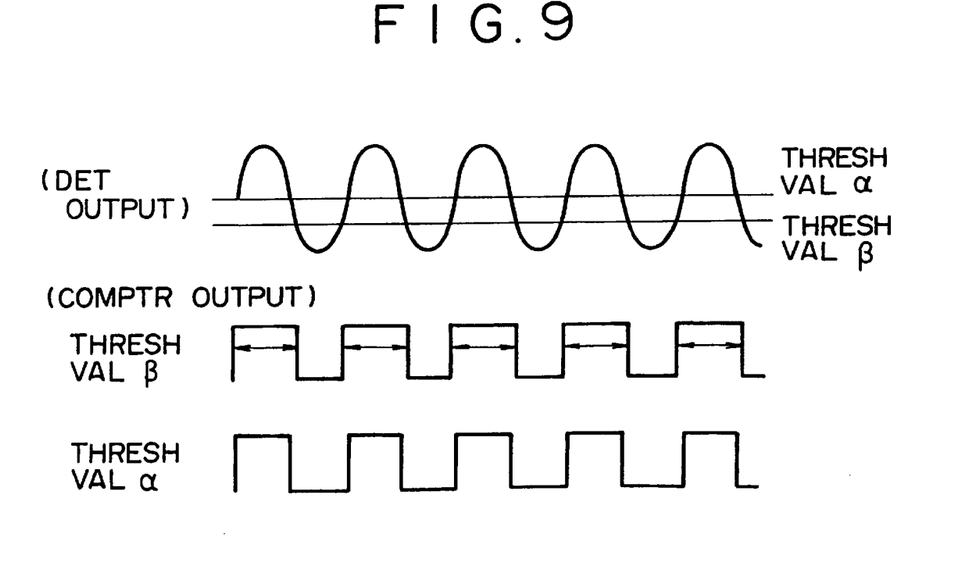
FIG. 9 is a drawing explanatory of deviations in the duty cycle.

Further, a fluctuation d of the average voltage as shown in FIG. 8 does not occur in the present embodiment at the time of quick charging (operation at a short time constant in order to start the demodulator circuit quickly), and a constant threshold level α can be maintained with respect to the detected output as shown in FIG. 9, and accordingly, any deviation in the duty cycle (refer to the upper graph of the comparator output) due to occurrence of an error as indicated by the threshold level β is not produced. Hence, it becomes possible to obtain a constant duty cycle (refer to the lower graph of the comparator output).

Figure 10:
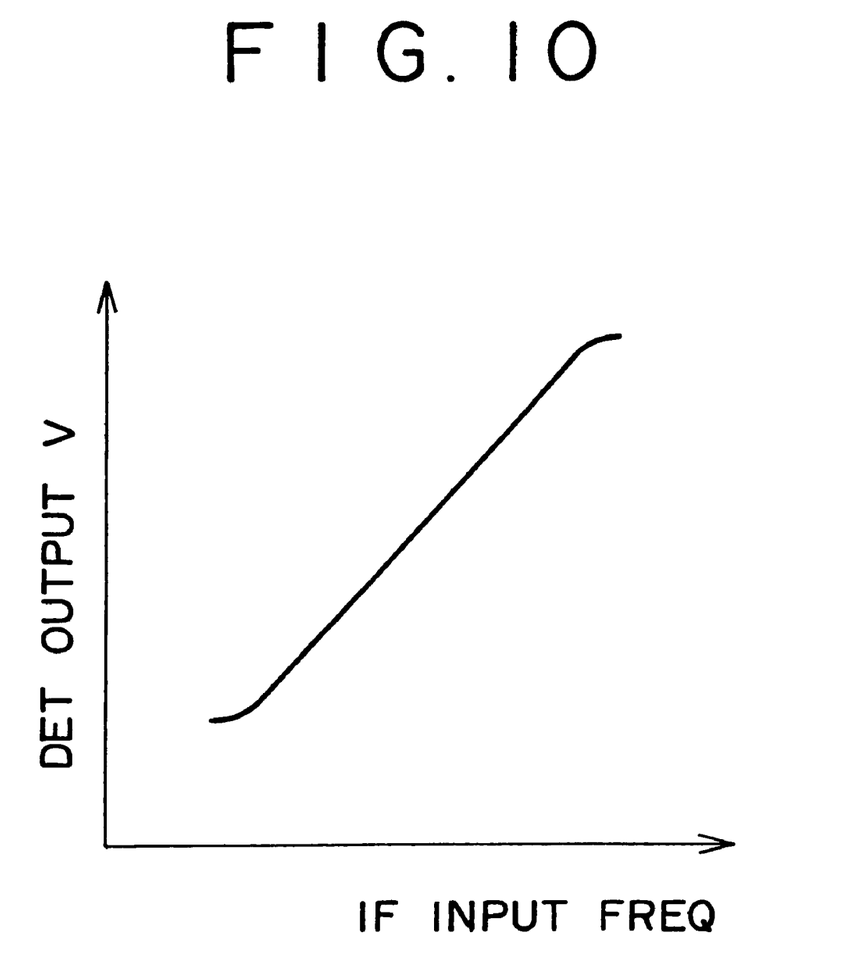
FIG. 10 is a graph showing detected output voltages against IF input frequencies.

Further, in the present embodiment, as shown in FIG. 3, the threshold level for the NRZ comparator 29 obtained in the threshold level setting circuit 31 is supplied to the local oscillator 30 to perform AFC. The AFC is carried out by making use of the fact that a deviation of the IF input frequency causes a deviation of the operating point of the detected output according to the relationship between the input frequency (IF) and the detected output voltage as shown in FIG. 10, i.e., the S-curve characteristic. Thus, feedback controlling to cope with deviations of the input frequency (IF) has become possible and, hence, it has been made possible to suppress shifts of the signal level and obtain the comparator output in accordance with the stabilized detected signal and threshold levels.

Although, in the above described first embodiment, an example was shown in FIG. 3 in which each of the threshold levels for the four-level comparator 28 and the NRZ comparator 29 were calculated from the detected output by the threshold level setting circuit 31, each of the threshold levels may be fixed and the relative magnitudes of the threshold levels and the level of the detected output may be adjusted by applying feedback control to the detected output.

Figure 11:
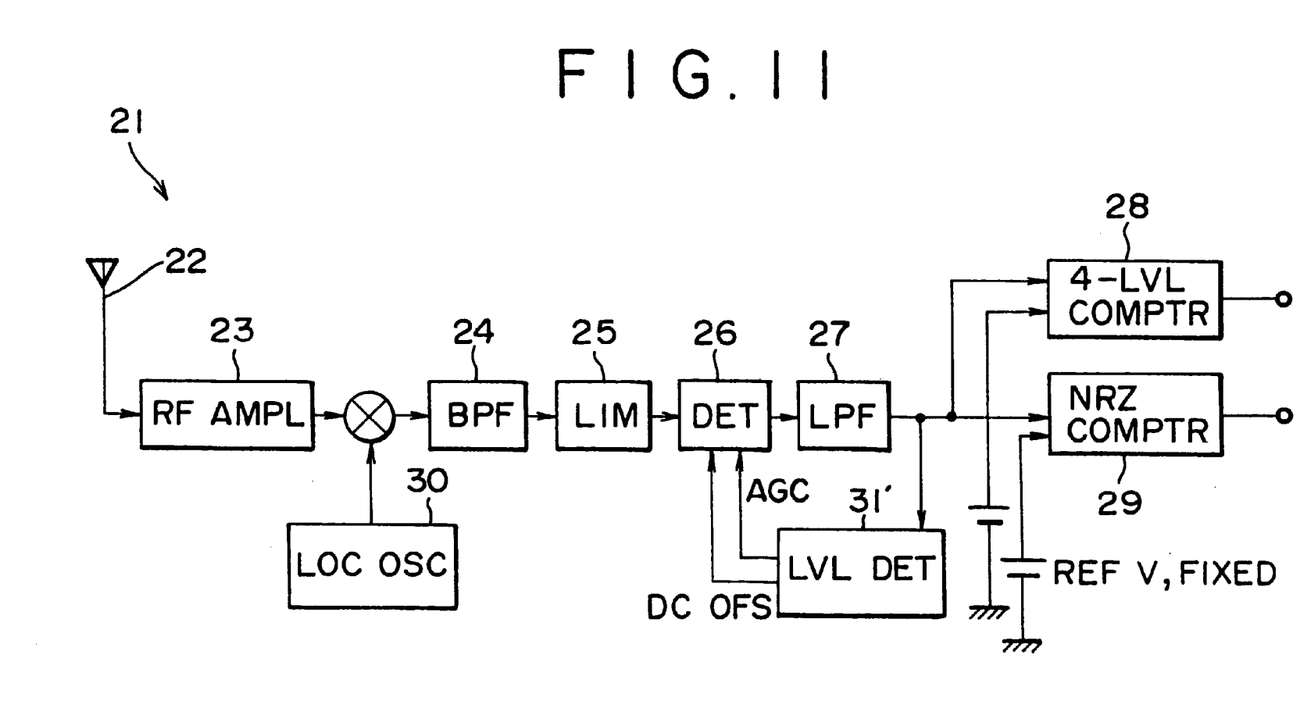
FIG. 11 is a block diagram explanatory of a third embodiment.

An example in which feedback control is applied to the detected output is shown as a third embodiment in the block diagram of FIG. 11. The third embodiment is similar to the first embodiment in that it comprises an antenna 22, an RF amplifier 23, a BPF (band-pass filter) 24, an LIM (limiter) 25, a DET (detector circuit) 26, an LPF (low-pass filter) 27, a four-level comparator 28, an NRZ comparator 29, and a local oscillator 30, but differs from the first embodiment in that there is provided a level detector circuit 31' for applying feedback control to the DET 26.

The level detector circuit 31' is similar to the threshold level setting circuit 31 comprising the MAX level detector circuit 31a and the MIN level detector circuit 31b shown in FIG. 4. The level detector circuit 31' gives a DC offset and the gain of the detected output to the DET 26 to thereby apply feedback control to the detected output. The DC offset corresponds to the AFC in the first embodiment and the gain of the detected output corresponds to the threshold levels for the four-level comparator 28 in the first embodiment (refer to FIG. 3).

In the circuit configuration of the third embodiment, the detected output is controlled so that each of the threshold levels are kept constant with respect to the level of the detected output and thereby it is made possible to obtain stabilized output data from the four-level comparator 28 and the NRZ comparator 29 as with the first embodiment.

While the four-level comparator 28 was used in each of the above described embodiments, the present invention is not limited to it but equally applicable to cases where another multi-level comparator is used.

According to the control circuit of the threshold levels for a multi-level comparator in the demodulator circuit of the invention, as described above, such effects can be obtained as mentioned below. That is, since the relative magnitudes of the level of the signal transmitted through a process of detection and the predetermined threshold levels for the multi-level comparator can be controlled, output data with stabilized sensitivity can be obtained even if there occur fluctuations in the circuit and parts, changes in temperature, or changes in the input signal level.

Further, stabilized demodulation can be achieved even if identical data are sent over continuously. Besides, fluctuations in the duty cycle of the output data can be suppressed and therefore a stabilized output can be obtained even right after quick charging. Thus, it has been made possible to provide a highly reliable demodulator circuit.

What is claimed is:

1. In a demodulator circuit for obtaining output data through comparison, made in a multi-level comparator, of a signal obtained by subjecting a received signal to a process of detection in a detector circuit and predetermined threshold levels, a control circuit of threshold levels for said multi-level comparator in said demodulator circuit comprising:

a level detector circuit for detecting the level of said received signal transmitted through the process of detection; and a control circuit for controlling relative magnitudes of the level detected in said level detector circuit of the signal transmitted through the process of detection and the predetermined threshold levels for said multi-level comparator, wherein at least one of the predetermined threshold levels controlled by said control circuit is used for applying feedback control to the detector circuit to handle deviations in an input frequency (IF).

2. A control circuit of threshold levels for a multi-level comparator in a demodulator circuit according to claim 1, wherein said control circuit sets the predetermined threshold levels for said multi-level comparator on the basis of the level detected in said level detector circuit of the signal transmitted through the process of detection.

3. A control circuit of threshold levels for a multi-level comparator in a demodulator circuit according to claim 1, wherein said control circuit controls the gain in said detector circuit on the basis of the level detected in said level detector circuit of the signal transmitted through the process of detection.

4. A control circuit of threshold levels for a multi-level comparator in a demodulator circuit according to claim 1, wherein said level detector circuit is configured to have a high impedance, thereby improving antinoise characteristics.

5. In a demodulator circuit for obtaining output data through comparison, made in a multi-level comparator, of a received signal and predetermined threshold levels, a control circuit of threshold levels for said multi-level comparator in said demodulator circuit comprising:

a detector circuit for applying a process of detection to said received signal;

a level detector circuit for detecting the level of the signal transmitted through the process of detection in said detector circuit; and a control circuit for controlling relative magnitudes of the level detected in said level detector circuit of the signal transmitted through the process of detection and the predetermined threshold levels for said multi-level comparator, wherein at least one of the predetermined threshold levels controlled by said control circuit is used for applying feedback control to the detector circuit to handle deviations in an input frequency (IF).

6. A control circuit of threshold levels for a multi-level comparator in a demodulator circuit according to claim 5, wherein said control circuit sets the predetermined threshold levels for said multi-level comparator on the basis of the level detected in said level detector circuit of the signal transmitted through the process of detection.

7. A control circuit of threshold levels for a multi-level comparator in a demodulator circuit according to claim 5, wherein said control circuit controls the gain in said detector circuit on the basis of the level detected in said level detector circuit of the signal transmitted through the process of detection.

8. A control circuit of threshold levels for a multi-level comparator in a demodulator circuit according to claim 5, wherein said level detector circuit includes a peak-hold circuit.

9. A control circuit of threshold levels for a multi-level comparator in a demodulator circuit according to claim 8, wherein said peak-hold circuit holds the peak value and the bottom value and provides a signal compounded of the peak value and the bottom value.

10. A control circuit of threshold levels for a multi-level comparator in a demodulator circuit according to claim 5, wherein said level detector circuit is configured to have a high impedance, thereby improving antinoise characteristics.

* * * * *